United States Patent

Stumpf et al.

[11] Patent Number: 6,130,718
[45] Date of Patent: *Oct. 10, 2000

[54] METHOD AND DEVICE FOR CORRECTING ERRORS IN THE OPENING OF TIME WINDOWS FOR RECOVERING DATA WITH HORIZONTAL SYNCHRONIZATION PULSES

[75] Inventors: Christof Stumpf, Meylan; Christian Tournier, Seyssinet-Pariset, both of France

[73] Assignee: Thomson Licensing S.A., Boulogne Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 08/850,678

[22] Filed: May 2, 1997

[30] Foreign Application Priority Data

May 14, 1996 [FR] France ..................... 9505961

[51] Int. Cl.$^7$ ........................ H04N 7/08
[52] U.S. Cl. .................. 348/465; 348/468; 348/546
[58] Field of Search ............... 348/465, 468, 348/546, 540, 536, 541, 524, 521

[56] References Cited

U.S. PATENT DOCUMENTS

| | | | |
|---|---|---|---|
| 4,737,849 | 4/1988 | Bauduin | 348/546 |
| 5,034,815 | 7/1991 | Shibayama | 358/153 |
| 5,045,941 | 9/1991 | Davies | 348/468 |
| 5,371,545 | 12/1994 | Tults | 348/465 |
| 5,436,668 | 7/1995 | Tults | 348/536 |
| 5,453,795 | 9/1995 | Tults | 348/465 |
| 5,559,560 | 9/1996 | Lee | 348/468 |
| 5,619,275 | 4/1997 | Tults | 348/468 |
| 5,654,764 | 8/1997 | Suh | 348/468 |
| 5,666,167 | 9/1997 | Tults | 348/465 |

FOREIGN PATENT DOCUMENTS

| | | | |
|---|---|---|---|
| 462752 A2 | 12/1991 | European Pat. Off. | H04N 5/10 |
| 533194 A1 | 3/1993 | European Pat. Off. | H04N 5/10 |
| 2556903 | 6/1985 | France | H03K 5/19 |
| 2151422 A | 7/1985 | United Kingdom | H04N 5/10 |
| WO 95/34987 | 12/1995 | WIPO | H04N 5/08 |

OTHER PUBLICATIONS

French Search Report Citing the above–listed references: AA, AM, AN, AO, AP and AQ.

*Primary Examiner*—Victor R. Kostak
*Attorney, Agent, or Firm*—Joseph S. Tripoli; Robert D. Shedd

[57] ABSTRACT

Method and device for correcting errors in synchronization of operations of recovering sequences of ancillary data transmitted over the invisible lines of the VBI of a video signal including a vertical synchronization signal Vsync and a horizontal synchronization signal Hsync used to synchronize the opening of time windows for recovery of the data. In the event of the absence of a horizontal synchronization pulse at the end of a period equal to H+ΔH, where H is the period of the signal Hsync and ΔH is a first predetermined lapse of time, an artificial synchronization pulse is generated, and the moment of opening of the window for recovering ancillary data to the moment of generation of the artificial synchronization pulses so as to cause the moment to coincide with the start of the sequence of ancillary data to be recovered.

12 Claims, 3 Drawing Sheets

METHOD AND DEVICE FOR CORRECTING ERRORS IN THE OPENING OF TIME WINDOWS FOR RECOVERING DATA WITH HORIZONTAL SYNCHRONIZATION PULSES

FIELD OF THE INVENTION

The present invention concerns the display, on a television screen for example, of ancillary information such as data of the TELETEXT, VPS (Video Programming System) or WSS (Wide Screen Signalling) type, transmitted on predefined lines of the VBI (Vertical Blanking Interval).

The invention concerns particularly a method and a device for correcting synchronisation errors in operations of recovering ancillary data sequences transmitted on the invisible lines of the VBI of a video signal including a vertical synchronisation signal Vsync and a horizontal synchronisation signal Hsync. The said signals Hsync and Vsync are used to synchronise the opening of time windows for recovery of the said data.

The signal Vsync includes a periodic succession of square waves v each having a duration equal to the duration of a video raster whilst the signal Hsync includes a periodic succession of pulses h with a duration of approximately 4 $\mu$s.

It is well known in the field of television programme transmissions that predefined lines of the VBI can be used for transmitting data representing either data of the TELETEXT type (information of all kinds such as weather or news, or information relating to the stock exchange), or of the VPS type enabling the start of recording of a programme to be programmed on a video recorder or the time of automatic change of the channel, or of the closed caption type (a sub-title accompanying programmes for the hard of hearing).

The circuits used to extract this information from the video signal must be capable of accurately detecting the lines of the VBI containing the ancillary data and the time of occurrence of the said data on each detected VBI line. A known solution in the prior art consists of using a line counter which is re-set to zero at the start of each video raster and the counting of which is synchronised with the start of each video line. A suitable decoder is used to generate time windows for recovery of the ancillary data. Generally the time of opening of a window is delayed with respect to the start of a video line so as to prevent sinusoidal signals present on each line, such as for example colour burst signals, being recovered.

The recovery of ancillary data therefore requires a vertical synchronisation signal for determining the line of the VBI to be explored and a horizontal synchronisation signal for opening, at the predetermined suitable moment, the time windows for recovery of the ancillary data present on the line explored. In a manner known per se, the said synchronisation signals are generally obtained from the line synchronisation signal and from the raster synchronisation signal transmitted with the video signal. The vertical synchronisation signal Vsync is obtained easily by a known digital integration technique, whilst the horizontal synchronisation signal Hsync is obtained, also in a known fashion, by means of a threshold detector for example and because of this its quality is closely linked to the quality of the video signal transmitted. This is because, if the video signal transmitted is of mediocre quality, the synchronisation signals can undergo deteriorations which make their detection haphazard. This can cause errors in synchronisation of the ancillary data recovery sequences. These errors may consist either of an absence of a horizontal synchronisation pulse or the presence of one or more erroneous additional pulses.

SUMMARY OF THE INVENTION

The aim of the invention is to detect the synchronisation errors liable to cause the loss of ancillary information and to correct the said errors rapidly and automatically.

According to the method of the invention, in the event of absence of a horizontal synchronisation pulse at the end of a period equal to H+$\Delta$H, where H is the period of the signal Hsync and $\Delta$H is a first predetermined lapse of time, an artificial synchronisation pulse ha is generated.

Thus the operation of recovery of the ancillary data is less sensitive to any disturbances liable to impair the quality of the signal transmitted.

According to a first characteristic of the method of the invention, as soon as a horizontal synchronisation pulse h is detected, a signal for masking any signal liable to be detected during a period M equal to H−$\Delta$H1 is generated, where $\Delta$H1 is a second predetermined lapse of time.

Thus the effects of additional pulses liable to cause a synchronisation error are systematically inhibited.

According to an essential characteristic of the method of the invention, in the event of artificial synchronisation, the moment of opening of the window for recovery of the ancillary data is shifted in time so as to cause the said moment to coincide with the start of the sequence of ancillary data to be recovered.

This shifting consists of opening the time windows at the start of a period less than at least three times the lapse of time $\Delta$H $\mu$s. Naturally this period can be chosen so as to be programmed according to the synchronisation delay introduced by the absence of a pulse h.

The method according to the invention is implemented by means of a device including a threshold detector which receives a CVBS signal (Composite Video Baseband Signal) and delivers a composite synchronisation signal Csync to a digital calculation unit designed to extract the vertical Vsync and horizontal Hsync synchronisation signals from the said composite signal Csync.

According to the invention, the digital calculation unit also includes a multiplexing means designed to select, from at least two different moments, a moment of opening of a time window for recovering the ancillary data contained in a line being explored.

BRIEF DESCRIPTION OF THE DRAWING

Other characteristics and advantages of the invention will emerge from the description which follows, taken by way of non-limitative example, with reference to the accompanying figures in which.

DETAILED DESCRIPTION

Figure 1:
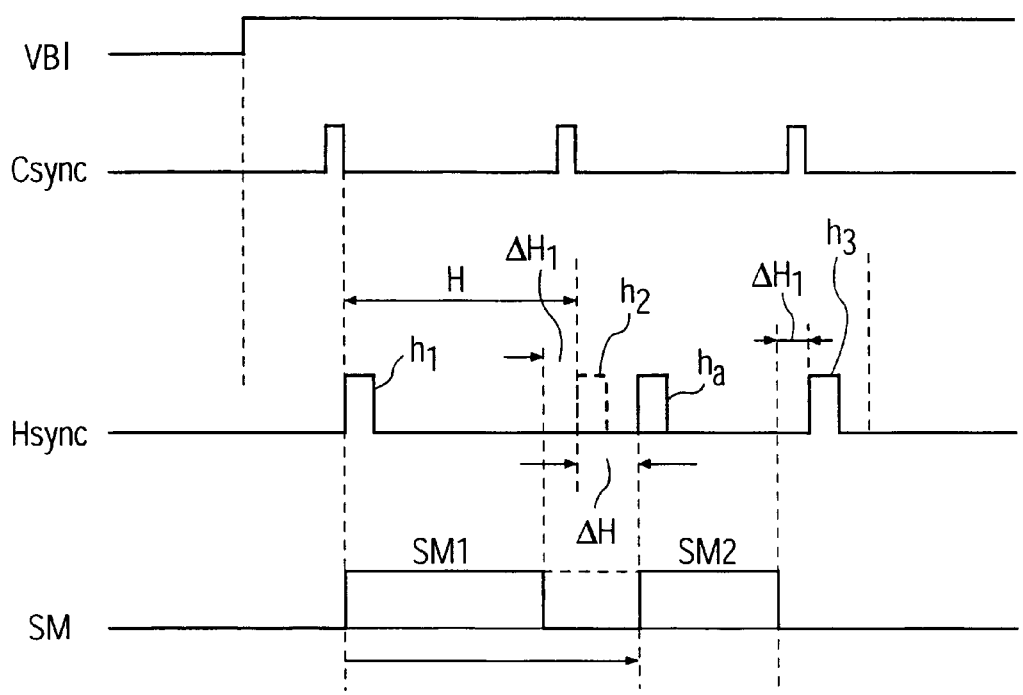
FIG. 1 and FIG. 2 depict timing diagrams illustrating the extraction of a horizontal synchronisation signal Hsync from a composite signal Csync according to the invention.

FIG. 1 depicts a timing diagram partially illustrating a first step of a method of correcting errors in synchronisation of the operations of recovering ancillary data transmitted over invisible lines of the VBI of a video signal carrying an image designed to he displayed on a screen. This video signal includes a signal Vsync consisting of a periodic succession of vertical synchronisation square waves v and a signal Hsync formed by a periodic succession of horizontal synchronisation pulses h. The said signals Vsync and Hsync are used for synchronising circuits effecting the opening of time windows for recovery of the said ancillary data present on a line being explored.

As can be seen in FIG. 1, the signal Hsync has a period H equal to the duration of a video line. The pulse h2, depicted in dotted lines, illustrates an undetected pulse. In this case, at the end of a period equal to H+DH, an artificial synchronisation pulse ha is generated, where DH is a first predetermined lapse of time. In addition, as soon as a horizontal synchronisation pulse h is detected, a signal is generated for masking any signal liable to be detected during a period M equal to H−ΔH1, where ΔH1 is a second predetermined lapse of time.

According to a preferred embodiment of the method of the invention, the time period ΔH is equal to 4 $\mu$s and ΔH1 is equal to ΔH/2.

According to an essential characteristic of the method of the invention, in the case of the generation of an artificial synchronisation pulse ha, the moment of opening of the window for recovery of ancillary data is shifted so as to cause the said moment of opening to coincide with the start of the sequence of ancillary data to be recovered.

It should be noted that this step occurs where a synchronisation pulse h is absent, as illustrated by FIG. 1, and where the said pulse h is detected with a delay time.

As can be seen in FIG. 1, the generation of the pulses h is synchronised on the falling edge of the composite signal Csync. Thus, as soon as a falling flank of the signal Csync appears, a pulse h1 and a first masking square wave SM1 are generated. In the case of the generation of an artificial synchronisation pulse, the duration M of the masking square wave SM1 is reduced so as to avoid masking the correct horizontal synchronisation pulse h2 following the missing horizontal synchronisation pulse. In the case illustrated by FIG. 1, where the said following pulse h2 is not detected, and where an artificial pulse ha is generated, a second masking square wave SM2 is generated synchronously with the rising edge of the artificial pulse ha. The duration of the said square wave SM2 is less than that of the first square wave SM1 so as not to mask the following pulse h3.

Figure 2:
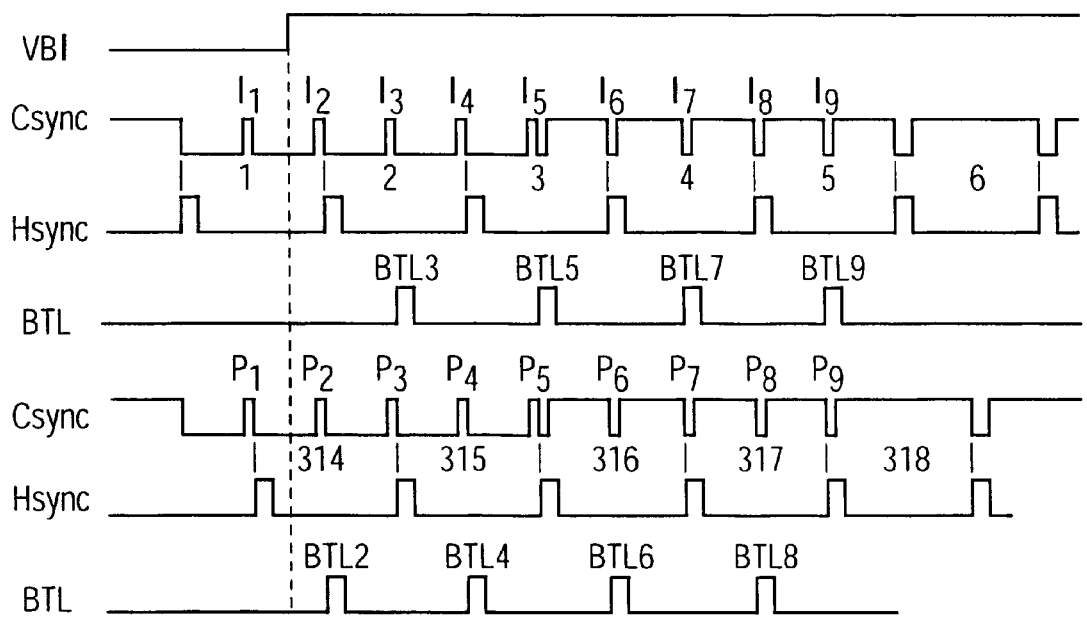
Figure 3:
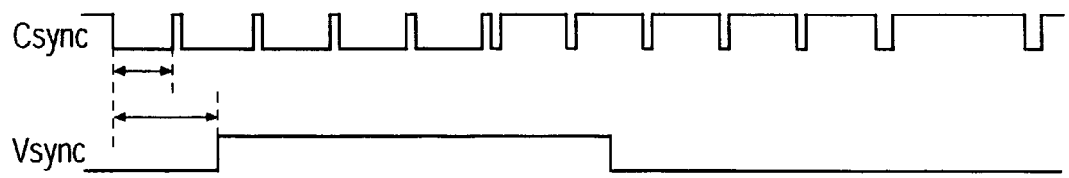
FIG. 3 depicts a timing diagram partially illustrating the extraction of a vertical synchronisation signal Vsync from the composite signal Csync according to the invention.
Figure 4:
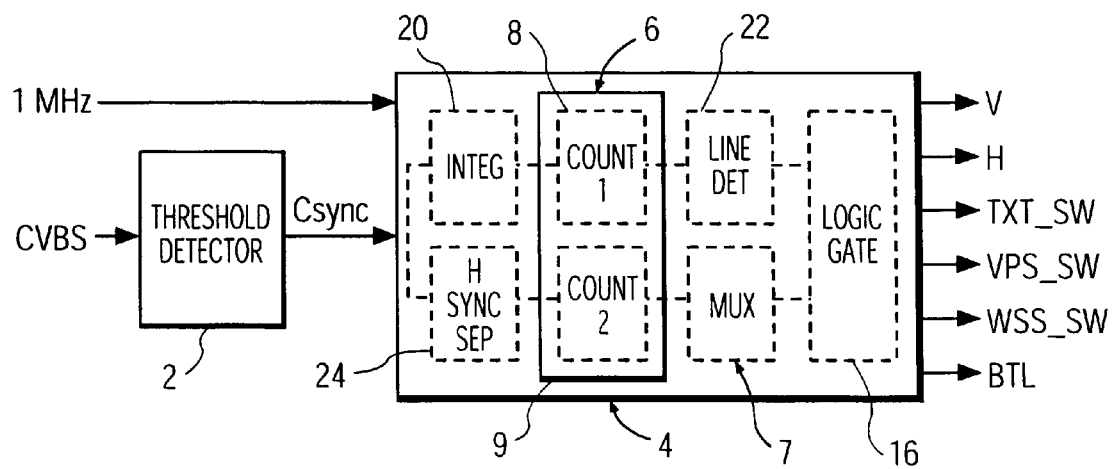
FIG. 4 depicts a block diagram of a device for recovering ancillary data according to the invention.

In another step of the method of the invention, a quality criterion is defined for the lines of the VBI in accordance with which the ancillary data present on a given line of the VBI will be recovered or abandoned. According to the said quality criterion, in the case of the detection of more than one pulse h during the masking period M, and in the case of the non-detection of a pulse h during the period H+ΔH, a pulse BTL indicating an erroneous line is generated. The number of pulses BTL is then sent to an acquisition unit, not shown, responsible for counting the number of erroneous lines detected. It should be noted however that a pulse BTL is generated at each detection of a half-line synchronisation pulse, although the line explored is not erroneous, as depicted in FIG. 2. The number of pulses BTL thus generated depends on the television standard used. The example in FIG. 2 corresponds to the PAL standard in which the composite synchronisation signal includes nine half-line synchronisation pulses I1, I2, I3, I4, I5, I6, I7, I8 and I9 for the odd raster, and nine half-line synchronisation pulses P1, P2, P3, P4, P5, P6, P7, P8 and P9 for the even raster. This is because the pulses I3, I5, I7 and I9 are generated during the masking period and therefore produce respectively the pulses BTL3, BTL5, BTL7 and BTL9. In the same way, the pulses P2, P4, P6 and P8 are also generated during the masking period and produce respectively the pulses B2, B4, B6 and B8. The appearance of the said pulses BTL3, BTL5, BTL7 and BTL9 and of the pulses BTL2, BTL4, STL6 and BTL8 does not correspond to the detection of erroneous lines within the meaning of the quality criterion established in the method of the invention. Consequently the number of the said pulses is deduced, by the acquisition unit, from the total number of erroneous lines which is supplied to it.

It should be noted that the detection of a half-line during the VBI causes the loss of a pulse hsync and consequently a shift of one line in the current raster. In this case, a correct resynchronisation is found again automatically at the end of a video line number which depends on the lapse of time ΔH. By choosing ΔH so as to be equal to 4 $\mu$s, resynchronisation is obtained at the end of a period of 8 video lines.

The method according to the invention is implemented by means of a device including a threshold detector 2 which receives a CVBS signal and delivers a composite synchronisation signal Csync to a digital calculation unit 4 designed to extract the vertical Vsync and horizontal Hsync synchronisation signals from the said composite signal Csync. The said device also includes a module 6 for detecting the lines of the VBI comprising ancillary data. According to an essential characteristic of the device of the invention, the said digital calculation unit 4 also includes a multiplexing means 7 designed to select, from at least two different moments, a moment of opening of a time window for recovering ancillary data contained in a line being explored.

The moment selected is previously determined by means of the line selection module 6. The latter has a first counter 8 designed to indicate the line of the VBI to be explored, and a second counter 9 designed to determine the moment of opening of a time window in the indicated line. The said second counter 9 receives clock pulses at a frequency dependent on the desired or necessary resolution and determines, by counting the said clock pulses, a period at the end of which a window must be open. This frequency can be 1 MHz for example. The period at the end of which a window must be open is determined from the start of the line of the VBI being explored. At the end of the said line, the counter 8 is incremented by one line and the counter 9 is reset to zero.

Figure 5:
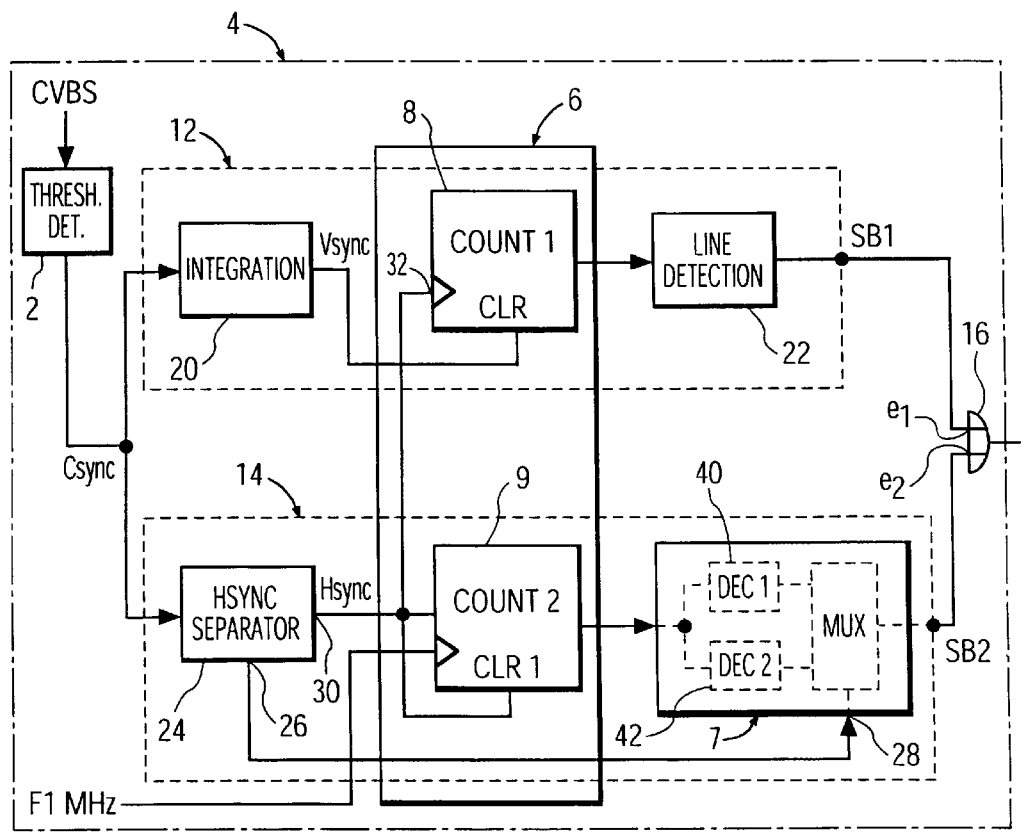
FIG. 5 depicts schematically a preferred embodiment of the device of FIG. 4.

As can be seen in FIG. 5, depicting a preferred embodiment of the device implementing the method of the invention, the digital calculation unit 4 has two units functioning in parallel, that is to say a first unit 12 dedicated to the extraction of the vertical synchronisation signal Vsync and a second unit dedicated to the extraction of the horizontal synchronisation signal Hsync, the said first and second units being connected to an output S of the threshold detector 2, whilst the respective outputs of the said first and second units are connected respectively to a first input e1 and to a second input e2 of a logic AND gate bearing the reference 16.

The first unit 12 has a digital integrator 20 having an input connected to the output S of the threshold detector 2 and an output connected to a zeroing input CLR of the first counter 8. The output of the said first counter 8 is connected, via a line decoder 22, to a first input e1 of the logic gate 16.

The second unit has a means 24 of separating the signal Hsync having an input connected to the output S of the threshold detector 2 and a first output 26 connected to a first input 28 of the multiplexing means 7 whilst a second output 30 is connected on the one hand to an input 32 of the first counter 8 and on the other hand to a zeroing input CLR1 of the second counter 9. The latter receives periodic pulses supplied by a clock, not shown, and delivers to the multiplexing means 7 at least two numerical values representing respectively a first moment WIN1 prior to a second moment WIN2 of opening of the ancillary data recovery window.

The multiplexing means 7 has a decoder 40 able to decode the moment WIN1 and a decoder 42 able to decode the moment WIN2.

In operation, the threshold detector 2 receives the CVBS (Composite Video Baseband Signal) and delivers the composite synchronisation signal Csync including the vertical Vsync and horizontal Hsync synchronisation signals. The said signals Vsync and Hsync are then extracted from the signal Csync respectively in the first unit 12 and in the second unit 14. As stated previously, the signal Vsync is extracted, in a manner known per se, by the digital integrator 20. The signal Vsync is then used to synchronise the resetting to zero of the first line counter 8 at each end of raster of the transmitted image.

Thus, when the first counter 8 detects a line of the VBI, the second counter 9 determines, by counting the clock pulses, the moment as from which a time window must be opened. The said moment is transmitted to the multiplexing means 7, which receives simultaneously a control signal To delivered by the means 24 of separating the signal Hsync. In the event of an error due to the absence of a pulse h at the end of a period equal to 68 μs, the separation means 24 sends to the multiplexing means 7 a control signal To for advancing the moment of opening of the time window by activating a decoder 40. The latter decodes the first instant WIN1 thus making it possible to take account of the delay resulting from the absence of a pulse h and its replacement, 4 μs later, by a pulse ha. The numerical value selected by the multiplexing means 7 is then sent to the second input e2 of the logic gate 16. The output of the logic gate 16 supplies a time window for recovery of the ancillary data which are found on the line of the VBI whose number is supplied by the line decoder 22 to the first input e1 of the logic gate 16.

Figure 6:
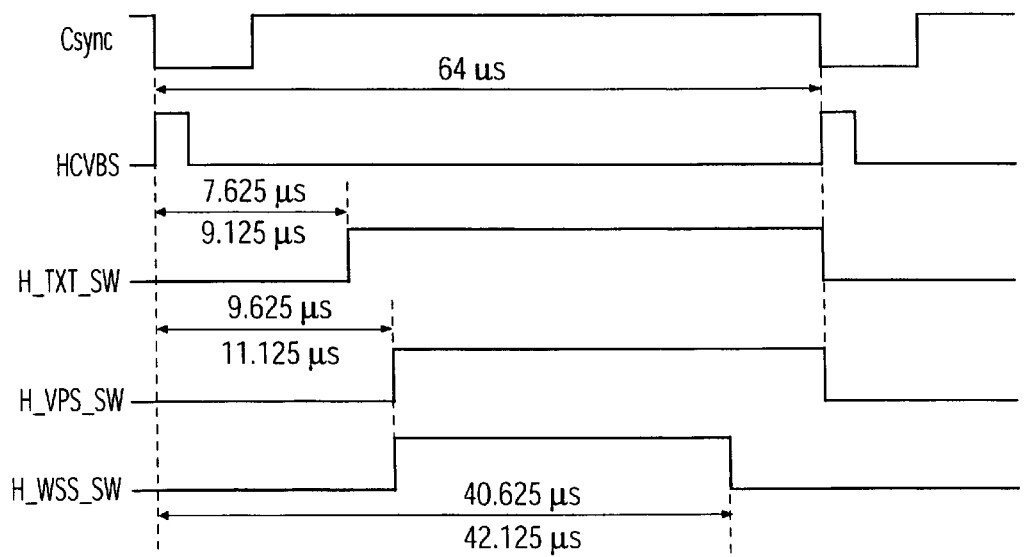
FIG. 6 depicts examples of time windows for recovering ancillary data obtained by the method according to the invention.

FIG. 6 illustrates, by means of a few examples of uses of the device according to the invention for generating time windows for recovering ancillary data TXT-SW, VBS-SW and WSS-SW respectively of the TELETEXT, VPS and WSS type.

We claim:

1. Method for correcting errors in synchronization in operations of recovering sequences of ancillary data transmitted in lines of the VBI of a video signal having a vertical synchronization signal Vsync and a horizontal synchronization signal Hsync, used for synchronising the opening of time windows for recovering the data, an artificial synchronization pulse being generated in the event of absence of a horizontal synchronization pulse at the end of a period equal to H+ΔH, where H is the period of the signal Hsync and ΔH is a first predetermined lapse of time, ΔH being small compared to H and comprising the steps of:

generating the artificial synchronization pulse; and
shifting the moment of opening of the window for recovering ancillary data to the moment of generation of the artificial synchronization pulse so as to cause the moment to coincide with the start of the sequence of ancillary data to be recovered.

2. Method according to claim 1, characterised in that, as soon as a horizontal synchronisation pulse is detected, a signal for masking any signal liable to be detected during a period M equal to H−ΔH1 is generated, ΔH1 being a second predetermined lapse of time.

3. Method according to claim 2, characterised in that, in the event of the generation of an artificial synchronisation pulse, the duration of the masking signal is reduced so as to avoid masking the correct horizontal synchronisation pulse following the missing horizontal synchronisation pulse.

4. Method according to claim 2, characterised in that the second lapse of time ΔH1 is equal to ΔH/2.

5. Method according to claim 1 characterised in that, in the event of detection of at least one synchronisation pulse during the period M, and in the event of the non-detection of synchronisation pulses during the period H+ΔH, a pulse BTL indicating an erroneous line is generated.

6. Method according to claim 5, characterised in that the first lapse of time ΔH is chosen so as to be equal to 4 ms.

7. Device for recovering ancillary data comprising:
a threshold detector receiving a CVBS signal and delivering a composite synchronization signal Csync to a digital calculation unit designed to extract the vertical Vsync and horizontal Hsync synchronization signals from the composite signal Csync, wherein:
the digital calculation unit also includes a multiplexing means for selecting, from at least two different moments, a moment of opening of a time window for recovering the ancillary data contained in a line being explored as a function of the insertion or not of an artificial synchronisation pulse.

8. Device according to claim 7, wherein the digital calculation unit comprises a first unit dedicated to the extraction of the signal Vsync and a second unit dedicated to the extraction of the signal Hsync, the first and second units functioning in parallel and being connected to an output S of the threshold detector, and the respective outputs of the first and second units are connected respectively to a first input and to a second input of a logic AND gate.

9. Device according to claim 8, wherein the first unit comprises a digital integrator having an input connected to the output S of the threshold detector and an output connected to a zeroing input of a first counter whose output is connected, via a line decoder, to the first input of the logic AND gate.

10. Device according to claim 9, wherein the second unit comprises means for separating the signal Hsync having an input connected to the output of the threshold detector, having a first output connected to a first input of the multiplexing means, and having a second output connected to an input of the first counter and to a zeroing input of a second counter.

11. Device according to claim 10, wherein the second counter receives periodic pulses supplied by a clock and delivers to the multiplexing means at least two numerical values representing respectively a first moment and a second moment of opening of the window for recovering ancillary data.

12. Device according to claim 11, wherein the multiplexing means comprises a first decoder for decoding the first moment and a second decoder for decoding the second moment correlatively with a control signal received from the separation means, the output of the multiplexing means being connected to a second input of the logic AND gate.

* * * * *